United States Patent [19]

Singer et al.

[11] 4,453,598

[45] Jun. 12, 1984

[54] DRILLING MUD DISPLACEMENT PROCESS

[76] Inventors: Arnold M. Singer, 3042 Las Palmas, Houston, Tex. 77027; John E. Oliver, 3752 Del Monte, Houston, Tex. 77019

[21] Appl. No.: 420,140

[22] Filed: Sep. 20, 1982

[51] Int. Cl.³ .......................................... E21B 37/00
[52] U.S. Cl. ....................................................... 166/312
[58] Field of Search ................................. 166/311, 312

[56] References Cited

U.S. PATENT DOCUMENTS

| | | | |
|---|---|---|---|
| Re. 23,614 | 1/1953 | Denman | 210/749 |
| 2,315,734 | 4/1943 | Ralston et al. | 252/326 |
| 2,343,430 | 3/1943 | Wells et al. | 210/749 |
| 2,978,026 | 4/1961 | Bemis | 166/312 |
| 3,122,203 | 2/1964 | Hawkins | 166/312 |
| 3,411,580 | 11/1968 | McKinney et al. | 166/312 |
| 3,524,908 | 8/1970 | Redmore et al. | 210/749 |
| 3,617,568 | 11/1971 | Ries, Jr. | 210/727 |
| 3,787,319 | 1/1974 | Larsen | 252/8.5 |
| 3,798,270 | 3/1974 | Lee et al. | 260/566 |
| 3,882,029 | 5/1975 | Fischer et al. | 252/8.5 |
| 4,025,443 | 5/1977 | Jackson | 252/8.5 |
| 4,032,460 | 6/1977 | Zilch et al. | 252/8.55 |
| 4,140,639 | 2/1979 | Jackson | 252/8.5 |
| 4,172,801 | 10/1979 | Jackson | 252/8.5 |
| 4,233,162 | 11/1980 | Carney | 252/8.5 |
| 4,255,258 | 3/1981 | Carr et al. | 210/727 |

OTHER PUBLICATIONS

Societe of Petroleum Engineers of AIME (SPE) 9425 "Field Experience Utilizing High Density Brines as Completion Fluids" Laboratory Investigation of Lightweight, Low-Viscosity Cementing Spacer Fluids.

Primary Examiner—Stephen J. Novosad
Assistant Examiner—William P. Neuder
Attorney, Agent, or Firm—Vaden, Eickenroht, Thompson, Bednar & Jamison

[57] ABSTRACT

An improved displacement process for eliminating drilling mud (solids and oil) from a well system prior to introduction of solids-free completion and packer brine. Clean water is circulated in the well system to remove and carry the major portion of the drilling mud. A treated water is prepared from a surfactant and alcohol admixed in clean water. Without interrupting circulation, the treated water displaces the clean water carrying drilling mud from the well system. Circulation of the treated water continues in the well system in which the brine is to be received until substantially all of the drilling mud is carried in the circulating treated water. Again without interrupting circulation, the treated water is displaced from the well system to a suitable disposal region with solids-free clean water. Lastly, the solids-free clean water is displaced from the well system with the solids-free brine.

15 Claims, 1 Drawing Figure

DRILLING MUD DISPLACEMENT PROCESS

RELATED PATENT APPLICATION

Chemically Cleaning Drilling/Completion/Packer Brines; Ser. No. 310,653, filed Oct. 13, 1981 by Arnold M. Singer and John E. Oliver, Jr.

BACKGROUND OF THE INVENTION

1. Field of the Invention

This invention relates to the use of high and low density brines in wellbores, and it more particularly relates to the complete removal of drilling mud (solid and oil) from the wellbore prior to introduction of the solids-free brines.

2. Description of the Prior Art

Aqueous brine solutions of high density are used in wellbores employed in the production of petroleum. These solutions have been used as both drilling, completion and packer fluids especially in deep wells subject to high formation gas pressures at elevated temperatures. These brines can be formed of the sodium, calcium, zinc salts with chloride, bromide and potassium. These aqueous fluids may include corrosion inhibitors and other salts such as soda ash. The density of these salt type well fluids depends on the particular salt, or mixture of salts, and their concentration in the aqueous well fluid. Usually, these salt type well fluids have a density in the range of between about 8 and 17 pounds per gallon.

The salt type well fluid should be solids-free in its use as a well fluid. If there are solids in a packer or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solids deposits make it difficult to disconnect the tubing from the packer with a resultant costly well workover.

The high density brine can be prepared at the wellsite by dissolving the prescribed amount of salt into the aqueous phase, which phase is principally fresh or sea water but it can include various inhibitors for preventing pitting, corrosion, etc. The mixture is circulated or agitated in the surface mud system equipment until there were no undissolved salt solids. Naturally, the problems of adding salts to be dissolved in the aqueous well fluid became progressively more severe as the density increases, both in time, manpower and equipment requirements. Importantly, the surface mud system must be scrupulously clean of any solids, especially the solid and oil portions of drilling mud. Otherwise, the prepared brine must be filtered to remove solids until the solids content has been reduced to less than 2-3 p.p.m.

At present, vendors will deliver to the wellsite the prepared high density brine of a desired density and combination of selected ingredients. The delivery of brine usually requires several changes in containers. For example, the brine is moved from the vendor tanks to truck transport, offshore supply boat and into the rig mud system. In most circumstances, the brine becomes contaminated from the mud system by undesired solids, including residual water wetted solids and/or oil based drilling mud, weighting agents such as barite, rust, salt, silt and sand, and other undissolved materials. Contaminating liquids such as mud bases, lubricants and diesel fuel can also be present in the mud system and entrained in the brine.

It has been a practice to clean the rig's mud system of residual drilling mud by various washing and manual clean-up techniques. For example, offshore rigs use jet streams of sea water and crewpersons with scrapers, brooms, etc. to attempt to remove residual drilling mud constituents. This technique for cleaning thoroughly the rig's mud system is very hazardous (slippery, wet, caustic and cramped work areas) and burdensomely expensive in labor costs. In addition, the cleaned mud system yet has residual drilling mud which hides in crevices, but that is entrained in the high density brine which passes therethrough. During the cleaning of the mud system, the rig must be shutdown for between 5 and 13 hours on the average. The costs of cleaning ranges from about $3000 to $8000 per hour. Thus, avoiding this cleaning procedure would save rig down time in an amount of $40,000.

As a practical result, present day rig practices, especially offshore, require full stream filtration (usually in cartridge filters) of the brine so that solid levels less than 2 p.p.m. are reached immediately before the brine is sent into the well bore.

A process has been developed for removing the contaminating solids from high density, salt-type (brine) aqueous drilling, completion and packer fluids before their placement into a well bore. This process is described in our pending application Ser. No. 310,653 filed Oct. 13, 1981, which application for descriptive purposes is incorporated herein. Thus, the solids contaminated brine can be cleaned by our unique process, specifically before it enters the surface mud equipment of the well system.

The present process is an improved process for removing substantially all of the drilling mud, including solids such as barite, bentonite, cement, etc. and oil materials, from the well system prior to entry therein of the solids-free completion and packer brine. As a result, the brine remains substantially free of solids but if filtration is needed, the filter loading remains very small and does not involve any significant expense in rig time. The overall rig down time to practice the present process requires only two-to-three hours. Especially larger rig downtime savings are achieved in deep offshore wells with high angles of directional wellbores (e.g. 70 degrees).

SUMMARY OF THE INVENTION

In accordance with this invention, there is provided an improved displacement process for eliminating drilling mud components of solids and oil from a well system prior to introduction of solids-free completion and packer brine. The drilling mud is displaced from the well system by circulating therein clean water until a major portion of the drilling mud is removed from the well system and carried in the clean water. A treated water is prepared by addition of a surfactant and alcohol to clean water in the surface equipment on the well system with agitation and shear mixing conditions. The treated water is circulated through the well system (including both surface and wellbore equipment) to (1) displace therefrom the drilling mud carrying clean water and (2) flow in the well system receiving the brine until substantially all of the drilling mud is suspended in the treated water. Without interrupting fluid circulation, the treated water is displaced from the well system to a suitable disposal region by a clean water circulated through the well system. Then, this latter clean water is displaced from the parts of the well system receiving the brine from an external source by solids-free completion brine.

DESCRIPTION OF THE PREFERRED EMBODIMENT

Figure 1:
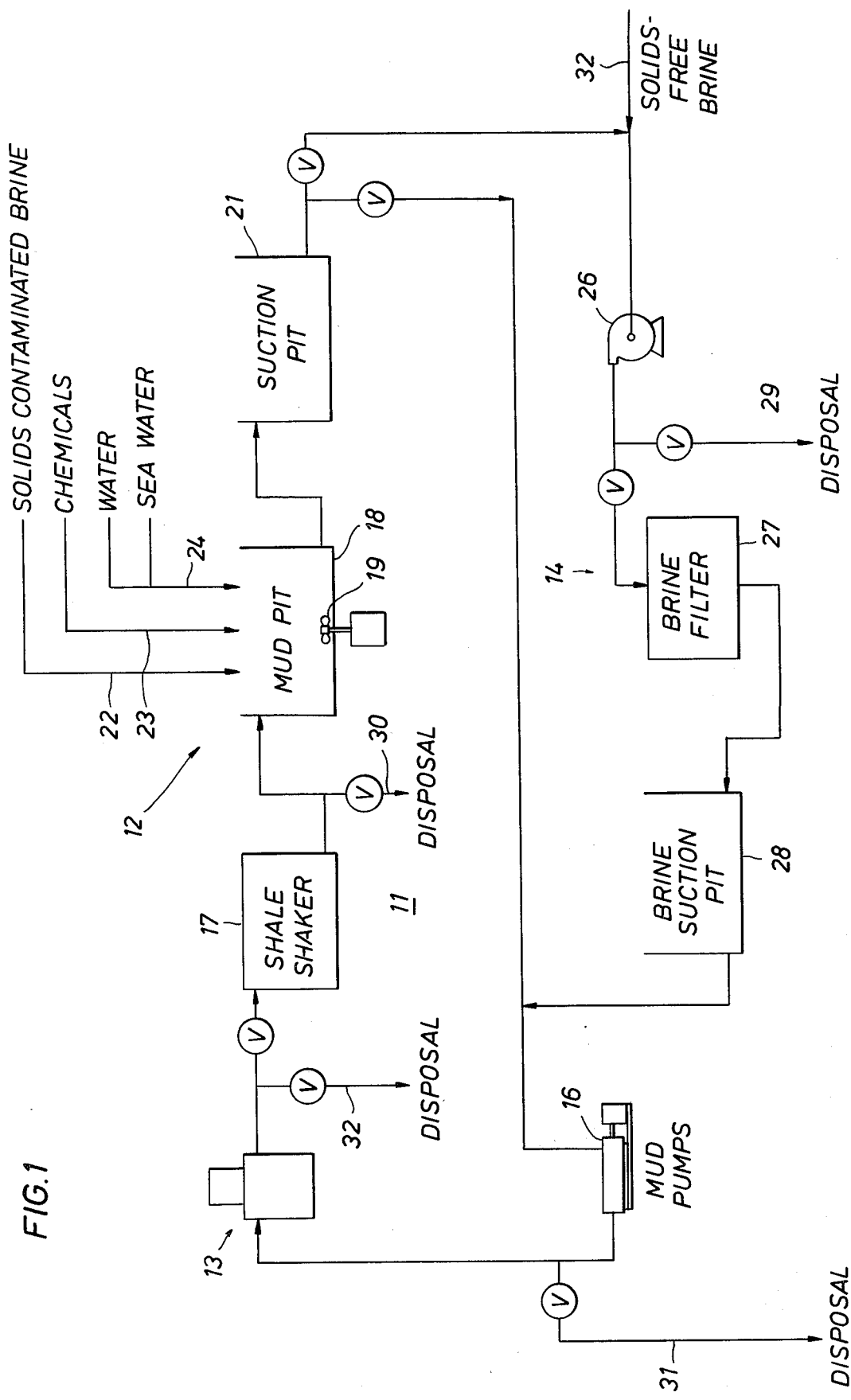
FIG. 1 is a schematic flow diagram illustrative of the drilling mud equipment on a well system which includes filtering apparatus for preparing solids free brine prior to its introduction into a wellbore.

Referring to the drawings, there is shown in schematic a well system 11 which includes surface equipment 12 and wellbore equipment 13 forming a part of the drilling mud system which may be found on offshore oil-well rigs. Also, the well system 11 can include a treating unit 14 which is adapted to remove solids so as to provide a high density brine in a low solids content, e.g. less than 2 p.p.m. The well system 11 can include other apparatus, or apparatus in a different arrangement and yet be used to practice the present improved displacement process.

For example, the surface equipment can include mud pumps 16 to circulate drilling mud through the well bore equipment 13, and the circulating loop from this equipment can have a shale/desander/desilter shaker 17, a mud pit 18 with power driven mixers 19 and a suction mud pit 21. The mud pit 18 and suction pit 21 can be metal vessels such as used offshore.

The mud pit 18 may contain inlets 22, 23 and 24 for the addition of various well materials such as solids contaminated brine, chemicals and clean or sea water. The terminology clean or sea water are meant to designate water that may be fresh or salty as from the ocean but with relatively low solids contents, e.g., less than 200 p.p.m.

In usual practice, the surface equipment 12 will be used to receive the brine from a source, such as barge or marine vessel transport, and to treat the brine to a solids-free condition for placement into the wellbore equipment 13. Solids contaminated brines can be treated to the desired solids free condition in the surface equipment 12 by the unique process described in the pending patent application heretofore identified. However, the surface equipment should be substantially free of drilling mud to insure efficient results from this process.

The brine treating unit is interconnected by valving and flow lines to the suction pit 21 and mud pumps 16 so that the brine can be moved by a centrifugal pump 26 through a filter 27 (e.g. cartridge type) into a brine suction pit or vessel 28). Then, the mud pumps 16 can introduce the brine into the wellbore. Usually, the filter 27 is arranged to make the brine solids free to a residual solids content of less than 2 p.p.m.

The wellbore equipment 13 can include the well head, casing, tubing, packers, valving and other well associated apparatus, such as the blow-out preventers and surface mud lines etc.

Several disposal lines 29-32, with auxillary control valves are included in the well system 11 so that fluid from either the surface equipment 12 or the brine treatment unit 14 can be discharged to a suitable disposal in a pollution free and environmental safe region. An inlet 32 to the pump 26 can be used to introduce relatively solids free brine into the brine treatment unit 14.

Prior to introduction of the brine into the well system 11, it must be cleaned of drilling mud (both as to solids and oil materials). For this purpose, the drilling mud is displaced from the well system by circulating therethrough a suitable volume of clean water introduced into the mud pit 19 from inlet 24. The clean water is circulated by the mud pumps 16. A major portion of the drilling mud is removed from the well system and carried in the clean water, which water can be discharged through one or more of the discharge lines to a suitable disposal region.

At this time, a treated water is prepared, preferably in the mud pit 18, by adding together clean or sea water, surfactant and an alcohol. The treated water is subjected to agitation and shear mixing by the mixer 19 while it is continuously circulated through the well system in both the surface and wellbore equipment. The treated water displaces the drilling mud ladened water from the well system via one of the discharge lines 29-32. Importantly, the treated water is circulated through those parts of the well system in which the brine is to be carried. The treated water is circulated in the well system 11 until substantially all of the residuary drilling mud is suspended therein.

Usually, the treated water is comprised in a chemical to water ratio of 4 drums (55 gallons each) admixed with each 500 barrels (55 gallons each) circulated in the well system. Each drum is comprised of a 50/50 composition of the surfactant and alcohol. As a result, the treated water has a concentration by volume each of about 0.8% of surfactant and alcohol. In most situations, the concentration of the chemicals need not be greater than 1%, and a 0.5% concentration works well.

The alcohol can be an aliphatic alcohol with between 5 and 8 carbon atoms and the surfactant is a surface active chemical aid with a molecular weight in the range of about 150 to about 500 with predominately hydrophobic characteristics. The surfactant is selected from the group comprising aliphatic amines, amides and aliphatic amine oxides wherein the amine and amide have an alkyl group with between 8 and 18 carbon atoms.

In the preferred embodiment, the alcohol is 2-ethylhexanol and the surface active chemical aid is bis hydroxy ethyl cetyl amine and each chemical is used in the amount of 0.5% volume of the clean/sea water used in preparing the treated water. Reference may be taken to our mentioned application for a more detailed description of these chemicals.

Other alcohols that work well include n-pentanol, n-hexanol and octanol.

Various amines can be used in this process. For example, the alkynol amines which are available under the Aquiness trademark can be used, such as Aquiness MA401A. It is understood that this amine is principally bis hydroxy ethyl cetyl amine.

Other examples of amines usable in this invention are cocoamine, octylamine, dioctylamine, decylamine and dodecylamine. Cocoamine may be generally represented by the formula $CH_3(CH_2)_{10}CH_2-NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms. However, the $C_{12}H_{25}$ group is in greater amount than any other group.

The cocoamine may be a condensation product, i.e. oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably the condensation product is formed by condensing 10 mols of ethylene oxide per mol of cocoamine. Expressed on the basis of molecular weight, the ethoxylated cocoamine may have an average molecular weight between 285 and 860, but preferably, has an average molecular weight of about 645.

The circulating treated water removes substantially all of the residual drilling mud (both solids and oils) from the well system. The drilling mud is carried in an agglomeration resembling gel-like soft masses of solids in a relatively stable suspension. The treated water effects a scrupulous cleaning of the well system and removes residual drilling mud in the flow lines, shaker, pits, valving, pumps etc. As a result, these equipment, both surface and wellbore, retain no significant amounts of drilling mud constituents. Stated in another manner, all of the remaining drilling mud from the earlier clean water circulation step is now suspended in the treated water being circulated in the equipment 12 and 13. No manual cleaning by rig workpersons is required. The unique treated water has removed from the equipment and carries the residual drilling mud in suspension.

While the treated water is yet being circulated within the well system, it is displaced via disposal lines 29-32 to a suitable non-polluting and safe disposal region. The displacing fluid is solids-free clean water added through inlet 24. The clean water has a solids content of preferably less than 2 p.p.m. After the well system is filled volumetrically with the solids-free clean water, the brine can be arranged for introduction into the wellbore.

If the brine is heavily loaded with solids as by transportation in dirty ships, it is placed into the mud pit 18 from which the clean water has been removed via disposal line 29. The dirty brine can then be treated by the process in our previously mentioned application.

If the brine is lightly loaded with solids, or free of solids, it is introduced at the inlet 32 and preferably forced by the pump 26 through the brine filter 27 and stored in the suction pit 28. At this time, the brine should have a solids content of less than 2 p.p.m. The filter 27 will have a long life since the solids loading from the brine is relatively low, e.g. 25 p.p.m.

Using the mud pump 16, the brine is moved from the pit 28 into the wellbore equipment (e.g. tubing, casing annulus and wellhead apparatus) and it volumetrically displaces the solids-free clean water through the disposal line 32.

The well system is now ready for subsequent activities once the downhole wellbore equipment is filled with the solids free brine.

It is preferred that the wellpipe or drillpipe, as the case may be, is reciprocated and rotated in the wellbore during circulation of the treated water. The pipe in deviated wells can be reciprocated about 30 feet with periodic rotation and this movement function accelerates removal of the drilling mud from the pipe and wellbore and its suspension in the treated water.

In some cases, an improved cleaning result is obtained if the alcohol and surfactant are added in two parts to clean water for producing the treated water. For example, one half of the chemicals are added at the beginning of circulation of the treated water, and the other half of the chemicals are added after circulation has been underway for thirty minutes, or when the wellpipe is to be reciprocated and rotated in the wellbore.

The use of circulating clean and treated waters in the well system is of advantage since only small amounts of the waters are required. It has been found that the volumes of clean water, treated water and solids-free waters used in this process are in the range of 250 to 1000 bbls. This feature is important in water scarce areas.

From the foregoing, it will be apparent that there has been herein described a displacement process for removing drilling mud from a well system which is especially effective prior to introduction of solids free brine. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for eliminating drilling mud solids and oil from a well system prior to introduction of solids-free completion and packer brines, the steps comprising:
   (a) displacing drilling mud from the well system by circulation therein of clean water until a major portion of the drilling mud is removed from the well system and carried in the clean water;
   (b) preparing a treated water with the addition of surfactant and alcohol to clean water and subjecting the treated water to agitation and shear mixing in the surface equipment on the well system;
   (c) circulating the treated water through both the surface equipment and the wellbore equipment of the well system to displace therefrom the clean water carrying drilling mud and circulating the treated water in the well system in which completion and packer brines are to be carried until substantially all of the drilling mud is suspended in the circulated treated water;
   (d) displacing from the well system to a suitable disposal region, with solids-free clean water, the treated water carrying the drilling mud without interruption of circulation through the well system; and
   (e) displacing the clean water from step (d) with solids-free completion and packer brine in the parts of the well system receiving the brine from a source exterior of the well system.

2. The process of claim 1 wherein the clean water can be sea water or fresh water relatively free of solids.

3. The process of claim 1 wherein in the wellbore equipment, the treated water is circulated through both well pipe and annulus in the wellbore and including any blow-out preventers, stand pipes and other devices associated with the wellbore equipment.

4. The process of claim 1 wherein in the surface equipment, the treated water is circulated through the surface equipment including pumps, hoppers, valving, mud cleaners, shale shakers.

5. The process of claim 1 wherein in the wellbore equipment, the wellpipe is reciprocated within the wellbore with periodic rotation to assist in suspending drilling mud in the circulating treated water.

6. The process of claim 5 wherein the wellpipe is reciprocated about 30 feet in the wellbore.

7. The process of claim 5 wherein a first part of the surfactant and alcohol are added to the clean water to produce the treated water before the well pipe is reciprocated and rotated, and thereafter the remaining part of the surfactant and alcohol are added to the clean water thereby forming the ultimate treated water circulated through the well system.

8. The process of claim 1 wherein the surfactant and alcohol are added each in a volume of less than about 1 percent to the clean water for producing the treated water.

9. The process of claim 1 wherein the surfactant has a molecular weight in the range from about 150 to about 500 with predominate hydrophobic characteristics, and the surfactant is selected from the group comprising aliphatic amine, amides and aliphatic amine oxides wherein the amine and amide constituents have an alkyl group with between 8 and 18 carbon atoms, and the alcohol is an aliphatic alcohol with between 5 and 8 carbon atoms.

10. The process of claim 1 wherein the surfactant is bis hydroxy ethyl cetyl amine and the alcohol is hexanol.

11. A process for eliminating drilling mud solids and oil from a well system prior to introduction of solids-free completion and packer brines, the steps comprising;
   (a) displacing drilling mud from the well system by circulation therein of clean water until a major portion of the drilling mud is removed from the well system and carried in the clean water;
   (b) preparing a treated water with addition of surfactant and alcohol to clean water, and subjecting the treated water to agitation and shear mixing in the surface equipment of the well system; said surfactant having a molecular weight in the range from about 150 to about 500 with predominately hydrophobic characteristics, and said surfactant selected from the group comprising aliphatic amines, amides and aliphatic amine oxides wherein the amine and amide constituents have an alkyl group with between 8 and 18 carbon atoms, and said alcohol is an aliphatic alcohol with between 5 and 8 carbon atoms;
   (c) circulating the treated water through both the surface equipment and the well bore equipment of the well system to displace therefrom the clean water carrying drilling fluid and then circulating the treated water in the well system in which the completion and packer brines are to be carried until substantially all of the drilling mud is suspended in the circulating treated water;
   (d) displacing from the well system to a suitable disposal region, with solids-free clean water, the treated water carrying the drilling mud without interruption of circulation through the well system; and
   (e) displacing the clean water from step (d) with solids-free completion and packer brine in those parts of the well system receiving the brine from a source exterior of the well system.

12. The process of claim 11 wherein the wellpipe is reciprocated and rotated periodically in the wellbore during circulation of the treated water to assist in removal of drilling mud from the wellbore equipment.

13. The process of claim 12 wherein a portion of the surfactant and alcohol are added before reciprocation and rotation of the well pipe, and thereafter the remaining portion forming the treated water.

14. The process of claim 11 wherein the surfactant and alcohol are added each in a volume of less than 1 percent to the clear water in producing the treated water.

15. The process of claim 11 wherein the surfactant is bis hydroxy ethyl cetyl amine and the alcohol is hexanol.

* * * * *